United States Patent [19]

MacRae et al.

[11] Patent Number: 4,483,599

[45] Date of Patent: Nov. 20, 1984

[54] SIMULTANEOUS VISUAL AND AUDIO SIGNAL APPARATUS

[75] Inventors: Sandy MacRae, Maidenhead; Les Young, London, both of England

[73] Assignee: Crystal Audio Visual Products, Ltd., England

[21] Appl. No.: 494,309

[22] Filed: May 13, 1983

[30] Foreign Application Priority Data

Oct. 6, 1982 [GB] United Kingdom ................ 8228486

[51] Int. Cl.³ ............................................. G03B 31/00
[52] U.S. Cl. ......................................... 352/22; 352/5; 352/23
[58] Field of Search .......................... 352/22, 23, 24, 5

[56] References Cited

U.S. PATENT DOCUMENTS

| | | | |
|---|---|---|---|
| 1,859,665 | 5/1932 | Golden et al. | 352/22 |
| 2,308,441 | 1/1943 | Dalgleish | 352/22 |
| 4,141,629 | 2/1979 | Mattes | 352/5 |
| 4,218,116 | 8/1980 | Bauer | 352/22 |

FOREIGN PATENT DOCUMENTS 1275155 9/1961 France ................................ 352/22

Primary Examiner—Monroe H. Hayes
Attorney, Agent, or Firm—Charles W. Helzer

[57] ABSTRACT

Apparatus is provided for producing simultaneous visual and audio signals for synchronizing separate simultaneously produced visual and sound recordings, e.g., for use when making cinematographic or video recordings and separate sound track recording. The apparatus comprises means such as a keyboard for entering and storing a selected sequence of alpha/numeric characters, means such as a liquid crystal display for visually displaying an entered and stored sequence of alpha/numeric characters, speech synthesizer means for audibly sounding the entered and stored sequence of alpha/numeric characters, and means for simultaneously providing visual and audible start marks for synchronization.

11 Claims, 1 Drawing Figure

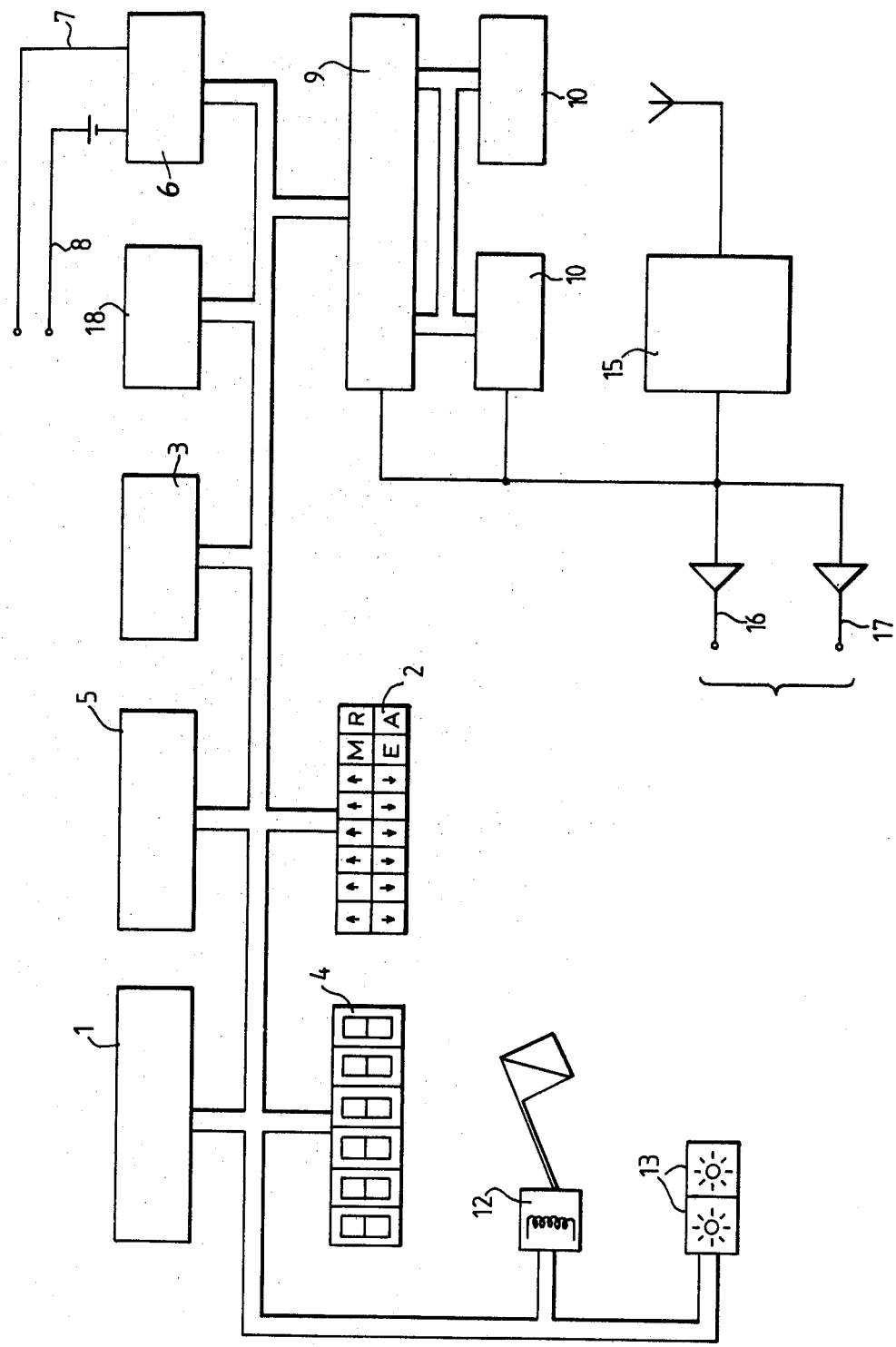

SIMULTANEOUS VISUAL AND AUDIO SIGNAL APPARATUS

The present apparatus relates to apparatus for providing simultaneous visual and audio signals.

When making cinematographic films with separate sound track it is necessary to provide information on both the film recording and the sound recording which enables corresponding parts of the film recording and the sound recording to be identified and the two recordings properly synchronized both during editing of the film and sound recordings and thereafter. Usually, the information which is provided on the film and sound recordings is a sequence of numbers and/or letters which indicate, for example, the camera number, the scene and the take. For example, the information which is recorded on both the film recording and the sound recording may be a six figure number one digit of which represents the camera number, three digits of which indicate the scene and two digits of which indicate the take. For this purpose the well known "clapperboard" is usually used which comprises a blackboard on which the required information to be recorded on the film and sound tracks is written and a hinged clapper portion which when manually moved smartly into contact with the blackboard portion produces a sharp clapping sound. Thus, when a take is about to commence, the appropriate sequence of numerals and/or letters indicating the camera number, scene, take or other desired information will be displayed on the blackboard and the clapperboard will be held by the operator so that the information on the blackboard can be recorded on the film. At the same time the clapperboard operator will call out the information written on the blackboard so that this can be recorded on the sound recording. With both the film camera and the sound recorder running the required synchronizing signal or "start marks" for synchronisation are then provided by the clapperboard operator operating the hinged clapper to provide a visual signal for the film recording and a simultaneous audible signal for the sound recording.

Whilst the clapperboard is still about the only system used in the cinematograph industry it is clumsy and has limitations which can sometimes place restraints on the film makers. For example, in order that the necessary visual and audible start marks for synchronisation will be recorded on the film and sound record respectively it is necessary that both the film camera and a microphone be located in the vicinity of the clapperboard.

The present invention has as its object to provide apparatus for replacing the clapperboard which is more convenient in use and which does not place the restraints on a film maker which the clapperboard does.

The present invention provides apparatus for providing simultaneous visual and audio signals, the apparatus comprising means for entering and storing a selected sequence of alpha/numeric characters, i.e., numerals and/or letters, means for visually displaying an entered and stored sequence of numerals and/or letters, speech synthesizer means for audibly sounding the entered and stored sequence of numerals and/or letters, and means for simultaneously providing visual and audible start marks for synchronisation.

The apparatus preferably comprises a keyboard, e.g., of the touch-sensitive kind, whereby a selected sequence of numerals and/or letters can be entered into the apparatus and a memory or memories for storing the entered sequence of numerals and/or letters.

The visual display means preferably comprises a liquid crystal display, e.g., a liquid crystal display capable of displaying up to six numerals. The liquid crystal display should be of a size such that a sequence of numerals displayed thereby can readily be recorded on a suitable recording medium such as a cinematograph film, videotape or the like.

The speech synthesizer may be any suitable speech synthesizer used in conjunction with a suitable memory and capable of audibly sounding a sequence of numerals and/or letters displayed on the visual display.

The means for simultaneously providing visual and audible start marks for synchronisation may comprise an electro-mechanical flag or flags or one or more light sources, preferably with a very fast response for providing the visual signal and means for generating a tone or other audible sound signal.

The apparatus may be such that it can be connected directly to the sound recording apparatus such as an audio or video tape recorder or may incorporate a suitable radio transmitter so that it can be located remote from the sound recording apparatus and the audible sounding of the selected sequence of numerals and/or letters and the audible start marks for synchronisation transmitted to a radio receiver connected with the sound recording apparatus.

In order that the invention will be more readily understood reference will hereinafter be made to the accompanying drawing which is a block diagram of one embodiment of apparatus according to the present invention.

Referring to the drawing it will be seen that the apparatus is controlled by a microprocessor 1 and comprises a touch-sensitive keyboard 2 whereby a required sequence of numerals can be entered into a scratch-pad memory 3 and a six digit liquid crystal display 4 for visually displaying an entered and stored sequence of numerals. A programme memory 5 stores the commands and instructions for the microprocessor 1. The apparatus is powered by a suitable power supply circuit 6 which is itself powered either from an external power supply 7 when available or from an internal battery 8. In addition the apparatus comprises a speech synthesizer 9, speech memories 10, and visual signal means in the form of an electromechanical flag 12 and a high intensity light sources 13 with a fast response. If desired, a radio transmitter 15 may be provided for transmitting synthesized speech from the speech synthesizer 9 to a remote receiver associated with sound recording apparatus or the apparatus may be connectable directly to sound recording apparatus by way of suitable outlets 16 and 17.

In use a required sequence of numbers and/or letters is keyed into the apparatus by means of keyboard 2 and is stored in the memory 3. The stored sequence of numerals and/or letters is displayed on the liquid crystal display 4 so that it can be recorded, e.g., on film or video tape. When shooting is about to commence a suitable switch key, button or the like is actuated whereupon the speech synthesizer 9 audibly sounds the first four digits or characters of the stored sequence, the flag 12 and light sources 13 are actuated to provide visual signals which can be recorded on the film, video tape or other visual recording medium and at the same time an audible tone is generated to provide an audible synchronizing signal for recording by the sound recording apparatus. Thereafter, the speech synthesizer will audibly sound the last two digits or characters of the entered sequence of numerals and/or letters. If desired, simultaneously with the actuating of the visual start mark for synchronisation 12 and 13 and the audible start mark for synchronisation, the liquid crystal display 4 may display the word "SYNC" or the like to indicate to the operator that the synchronizing signals have been given. Upon completion of the foregoing sequence the sequence of letters and/or numerals may be manually or automatically sequenced to a next sequence of numerals and/or letters ready for the next scene or "take".

Once a said sequence of operations has been completed, the apparatus is preferably such that it can either be switched to or will automatically switch to, after a predetermined period of time, a low-power mode in which power is supplied only to the memories and the liquid crystal display 4. In addition, when the apparatus is being powered by its internal battery, the apparatus is preferably such that it can be switched to or will automatically switch to after a given period of time a standby mode in which the only part of the apparatus to which the power is supplied is a back-up memory 18 in the form of a shift register which stores the contents of the display register whilst the apparatus is in its standby mode. A suitable switch, button or the like may be provided which will enable the liquid crystal display to be switched back on after the apparatus has entered the standby mode.

If desired a suitable switch, key, button or the like may be provided which will cause the selected sequence of numerals and/or letters to be displayed by the liquid crystal display both upside down and reversed, this being the standard way in the film industry of signifying an "end mark".

It will readily be appreciated that the apparatus of the present invention can be both compact and easy to use and that it does not impose the same restraints on film making as the conventional clapperboard.

We claim:

1. Apparatus for providing simultaneous visual and audio signals, the apparatus comprising means for entering and storing a selected sequence of alpha/numeric characters, means for visually displaying an entered and stored sequence of alpha/numeric characters, speech synthesizer means for audibly sounding the entered and stored sequence of alpha/ numeric characters, and means for simultaneously providing visual and audible start marks for synchronisation.

2. Apparatus according to claim 1, comprising a keyboard whereby a selected sequence of alpha/numeric characters can be entered into the apparatus and at least one memory for storing the entered sequence of alpha/numeric characters.

3. Apparatus according to claim 1, wherein said visual display means comprises a liquid crystal display.

4. Apparatus according to claim 3, wherein said liquid crystal display is adapted to display up to six numerals and is of a size such that a sequence of numerals displayed thereby can readily be recorded on a recording medium for visual signals.

5. Apparatus according to claim 1, wherein said means for simultaneously providing visual and audible start marks for synchronisation comprises at least one electro-mechanical flag and means for generating an audible sound signal.

6. Apparatus according to claim 1, wherein said means for simultaneously providing visual and audible start marks for synchronisation comprises at least one light source and means for generating an audible sound signal.

7. Apparatus according to claim 1, wherein said speech synthesizer means comprises at least one speech memory and a speech synthesizer for audibly sounding an entered and stored sequence of alpha/numeric characters.

8. Apparatus according to claim 1, wherein means is provided whereby the apparatus can be directly connected to sound recording apparatus.

9. Apparatus according to claim 1, and further comprising a radio transmitter whereby the audible sounding of the selected sequence of alpha/numeric characters can be transmitted to a remote radio receiver connected with sound recording apparatus.

10. Apparatus according to claim 3, wherein means is provided whereby said liquid crystal display can be caused to display the selected sequence of alpha/numeric characters both upside down and reversed.

11. Apparatus for providing simultaneous visual and audio signals for synchronising separate simultaneously produced visual and sound recordings, the apparatus comprising a keyboard whereby a selected sequence of alpha/numeric characters can be entered into the apparatus, at least one memory for storing the entered selected sequence of alpha/numeric characters, a liquid crystal display for visually displaying the entered and stored selected sequence of alpha/numeric characters, speech synthesizer means for audibly sounding the entered and stored selected sequence of alpha/numeric characters, and means for simultaneously providing visual and audible start marks for synchronisation including at least one electro-mechanical flag and at least one light source for providing visual start marks and means for generating a sound signal for providing the audible start mark.

* * * * *